(12) United States Patent
Lobet

(10) Patent No.: US 8,153,071 B2
(45) Date of Patent: Apr. 10, 2012

(54) FLUID PORTING ASSEMBLY AND MICROREACTOR INCORPORATING THE SAME

(75) Inventor: Olivier Lobet, Mennecy (FR)

(73) Assignee: Corning Incorporated, Corning, NY (US)

( * ) Notice: Subject to any disclaimer, the term of this patent is extended or adjusted under 35 U.S.C. 154(b) by 142 days.

(21) Appl. No.: 12/744,608

(22) PCT Filed: Nov. 25, 2008

(86) PCT No.: PCT/US2008/013119
§ 371 (c)(1),
(2), (4) Date: May 25, 2010

(87) PCT Pub. No.: WO2009/070288
PCT Pub. Date: Jun. 4, 2009

(65) Prior Publication Data
US 2010/0233042 A1    Sep. 16, 2010

(30) Foreign Application Priority Data
Nov. 29, 2007   (EP) ..................................... 07301599

(51) Int. Cl.
*B01J 19/00*     (2006.01)
*B01J 10/00*     (2006.01)
*B01J 12/00*     (2006.01)
*B01J 14/00*     (2006.01)
*B01J 3/00*      (2006.01)

(52) U.S. Cl. ........ 422/130; 422/129; 422/242; 422/600; 422/603

(58) Field of Classification Search ................. 422/129, 422/130, 242, 310, 504, 600, 603; 261/127, 261/128, 131, 137, 150, 158, 159
See application file for complete search history.

(56) References Cited

U.S. PATENT DOCUMENTS

| 7,569,195 B2 * | 8/2009 | Rogers et al. ................. 422/504 |
| 2005/0276730 A1 | 12/2005 | Dannoux et al. .............. 422/103 |
| 2006/0006065 A1 * | 1/2006 | Pinkas et al. .................. 204/451 |

* cited by examiner

*Primary Examiner* — Walter D Griffin
*Assistant Examiner* — Natasha Young
(74) *Attorney, Agent, or Firm* — Gregory V. Bean

(57) ABSTRACT

A fluid porting assembly for a microreactor comprising a process fluid passageway, a pliable seal, and a cooling fluid passageway is provided. The pliable seal is positioned in the vicinity of the process fluid outlet and is configured to define a sealing interface between the process fluid outlet and a fluid port of a microreactor. The cooling fluid passageway terminates at a cooling fluid interface and defines a dispensing gap between the cooling fluid interface and the sealing interface. The cooling fluid outlet is configured to distribute cooling fluid about a periphery of the pliable seal and to direct cooling fluid away from the periphery of the pliable seal through the dispensing gap when the pliable seal of the fluid porting assembly engages a fluid port of a microreactor. The cooling fluid removes heat from areas of the microreactor in the vicinity of the fluid port and pliable seal.

18 Claims, 2 Drawing Sheets

US 8,153,071 B2

FLUID PORTING ASSEMBLY AND MICROREACTOR INCORPORATING THE SAME

PRIORITY

This application claims priority to European Patent Application number 07301599.2, filed Nov. 29, 2007.

FIELD OF INVENTION

The present invention relates to microreactor technology. Microreactors are commonly referred to as microstructured reactors, microchannel reactors, or microfluidic devices. Regardless of the particular nomenclature utilized, the microreactor is a device in which a moving or static target sample is confined and subject to processing and/or analysis. Microchannels are the most typical form of such confinement and the microreactor is usually a continuous flow reactor, as opposed to a batch reactor. Microreactors offer many advantages over conventional scale reactors, including improvements in energy efficiency, reaction speed, reaction yield, safety, reliability, scalability, etc.

BACKGROUND

Microreactors are often employed where it is desirable to operate at very high or low temperatures or to provide high thermal transfer rates or high thermal transition rates. As a result, some microreactors are designed to tolerate higher reaction temperatures than typical conventional reactors. For example, a hermetic porting assembly for a glass or glass ceramic reactor is illustrated in detail in US Patent Application Publication No. 2005/0276730 A1.

SUMMARY OF THE INVENTION

Microreactors are normally operated continuously to allow subsequent processing of unstable intermediates and avoid typical batch workup delays. Continuous operation is often facilitated by suitable input and output porting with the microchannel network of the microreactor. The present inventors have recognized that this porting is desirably configured for operation at high temperatures and at high pressures. Pressurization of materials within microreactors and associated components generally allows reactions to be increased in rate—by raising the temperature beyond the boiling point of the solvent, for example—and may also allow dissolution of reactant gasses within the flow stream. Accordingly, the present invention relates generally to the design of secure input and output porting assemblies for microreactors for operation at relatively high temperatures and pressures, although the various configurations proposed herein are not limited to operation above specific temperatures and pressures.

According to one embodiment of the present invention, a fluid porting assembly for a microreactor is provided comprising a process fluid passageway, a pliable seal, and a cooling fluid passageway. The pliable seal is positioned in the vicinity of the process fluid outlet and is configured to define a sealing interface between the process fluid outlet and a fluid port of a microreactor. The cooling fluid passageway terminates at a cooling fluid interface and defines a dispensing gap between the cooling fluid interface and the sealing interface. The cooling fluid outlet is configured to distribute cooling fluid about a periphery of the pliable seal and to direct cooling fluid away from the periphery of the pliable seal through the dispensing gap. The fluid porting assembly can be configured such that, when the pliable seal of the fluid porting assembly engages a fluid port of a microreactor, cooling fluid distributed about the periphery of the pliable seal is directed away from the pliable seal along a surface of the microreactor to remove heat from areas of the microreactor in the vicinity of the fluid port and pliable seal.

BRIEF DESCRIPTION OF THE DRAWINGS

The following detailed description of specific embodiments of the present invention can be best understood when read in conjunction with the following drawings, where like structure is indicated with like reference numerals and in which.

Figure 1:
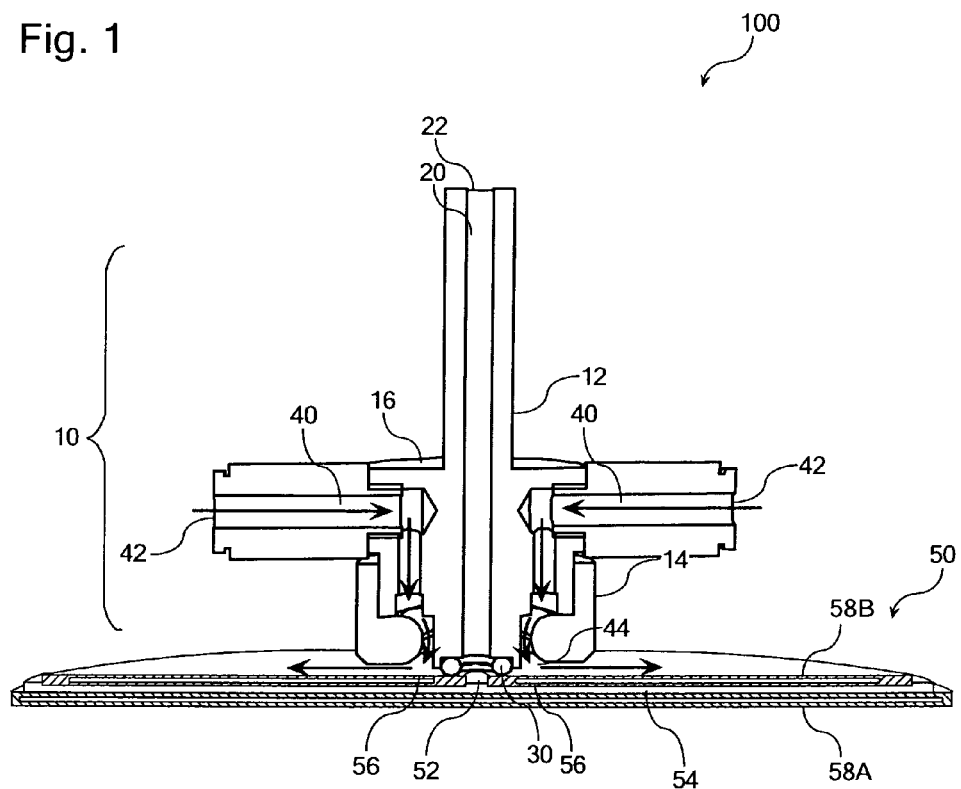
FIG. 1 is a schematic illustration of a microreactor assembly comprising a fluid porting assembly according to one embodiment of the present invention.

Referring initially to FIG. 1, the microreactor assembly 100 comprises a fluid porting assembly 10 and a microreactor 50. In the illustrated embodiment, the microreactor 50 comprises a single fluid port 52 in communication with one or more microreactor channels 54. However, as will be appreciated by those familiar with microreactor technology, the port and flow channel complexity of various microreactors can vary widely and has merely been illustrated in relatively simple schematic form in FIG. 1. In any event, the microreactor 50 also comprises a microreactor surface portion 56 surrounding the fluid port 52. The microreactor body as a whole, and the microreactor surface portion 56 in particular, are placed in thermal communication with heat exchangers 58A, 58B and, as such, are subject to elevated operating temperatures, referred to herein as the reaction temperature $T_R$. Although the particular structure of the heat exchangers 58A, 58B are beyond the scope of the present invention and could be replaced with any suitable means for controlling the temperature of the microreactor 50, it is noted that the heat exchangers 58A, 58B may comprise layered glass fluid channels sintered to surface portions of the microreactor 50 and utilize the circulation of thermal fluid to control the temperature of the microreactor 50.

Figure 2:
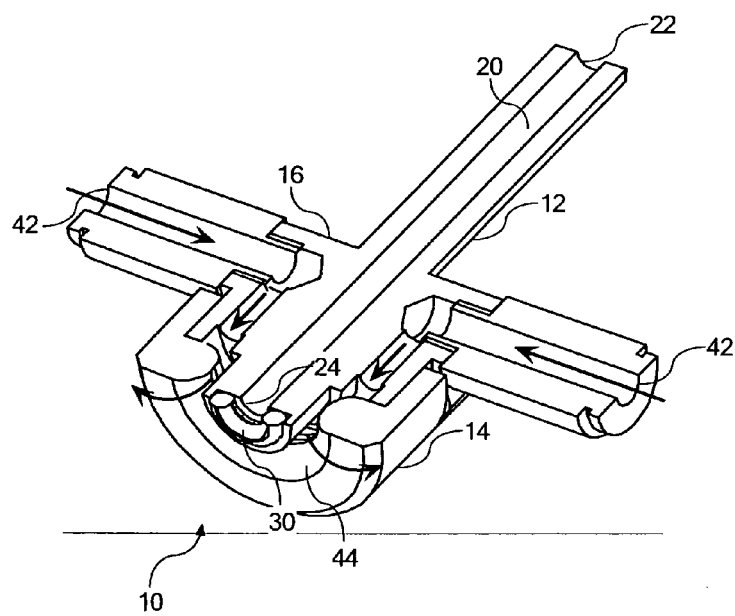
FIG. 2 is an isolated schematic illustration of the fluid porting assembly illustrated in FIG. 1.
Figure 3:
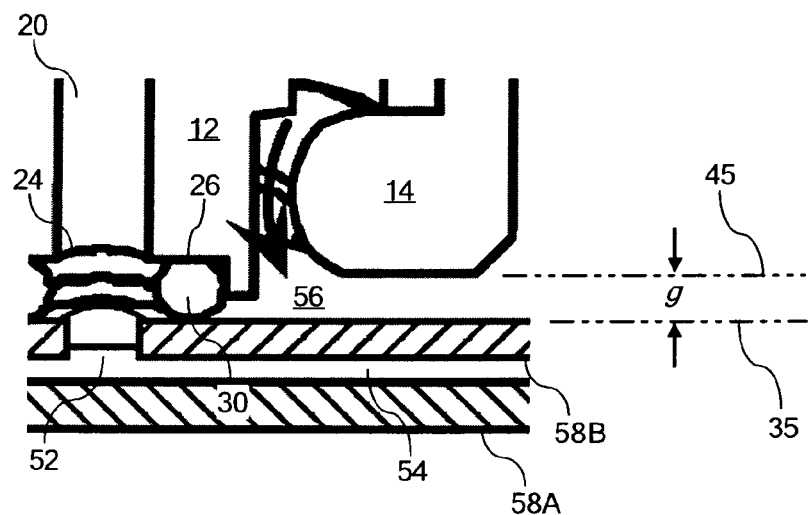
FIG. 3 is a magnified view of a portion of the assembly illustrated in FIG. 1.
Figure 4:
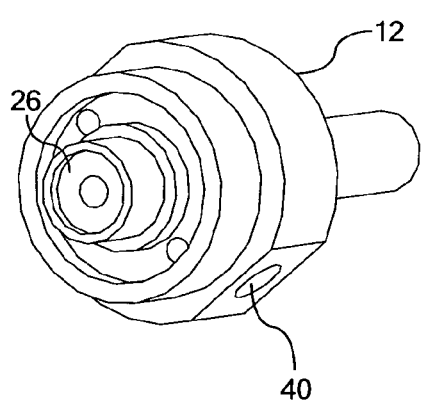
FIG. 4 is an isolated illustration of an interior body portion of the fluid porting assembly of FIG. 2.

The fluid porting assembly 10 is illustrated in further detail in FIGS. 2-4 and comprises a process fluid passageway 20 with a process fluid inlet 22 and a process fluid outlet 24. A pliable seal 30 is positioned in the vicinity of the process fluid outlet 24 and is configured to define a sealing interface 35 between the process fluid outlet 24 and the fluid port 52 of the microreactor 50. Because the sealing interface 35 can be subject to operating pressures in excess of 15 bars, care should be taken to ensure that the composition of the pliable seal 30 is selected to ensure proper sealing at the sealing interface. For example, the pliable seal 30 may comprises a polymeric O-ring and the process fluid outlet 24 may comprise an O-ring seat 26 that accommodates the O-ring 30.

In many instances the composition and configuration of the pliable seal 30 is such that it is more likely than not to fail at the aforementioned reaction temperature $T_R$. Accordingly, the fluid porting assembly 10 further comprises a cooling fluid passageway 40 with a cooling fluid inlet 42 and a cooling fluid outlet 44 that terminates at a cooling fluid interface 45. The cooling fluid interface 45 defined by the cooling fluid outlet 44 is displaced from the sealing interface 35 defined by the pliable seal 30 to define a dispensing gap g between the sealing interface 35 and the cooling fluid interface 45. In addition, as is illustrated in FIG. 1, the cooling fluid outlet 44 is configured to distribute cooling fluid about the periphery of the pliable seal 30 and to direct cooling fluid away from the periphery of the pliable seal through the dispensing gap g. In this manner, when the pliable seal 30 of the fluid porting assembly 10 engages the fluid port 52 of the microreactor 50, cooling fluid can be distributed about the periphery of the pliable seal 30 and directed away from the pliable seal 30 along the surface 56 of the microreactor 50 to remove heat from areas of the microreactor in the vicinity of the fluid port 52 and pliable seal 30 and preserve the operational integrity of the pliable seal 30.

As is illustrated in FIGS. 1 and 2, the cooling fluid passageway 40 is configured to direct fluid moving downstream from the cooling fluid inlet 42 toward the periphery of the pliable seal 30. In addition, the cross-sectional area of the cooling fluid outlet 44 expands in the downstream direction, further enhancing cooling in the vicinity of the pliable seal 30. The fluid porting assembly 10 may be constructed to comprise an interior body portion 12 that accommodates the process fluid passageway 20 and an exterior body portion 14 that cooperates with the interior body portion 12 to form the cooling fluid passageway 40. In the illustrated embodiment, the exterior body portion is mounted to the interior body portion, although it is contemplated that the two body portions could be mounted to the microreactor 50 independently.

To facilitate proper installation, mounting, and sealing, the interior body portion 12, the exterior body portion 14, or both, can be configured to define a clamping surface 16 against which a clamping force can be applied to urge the pliable seal 30 into engagement with the microreactor surface portion 56 surrounding the fluid port 52 of the microreactor 50. Further, the interior body portion 12 and the exterior body portion 14 can be configured to define the illustrated coaxial configuration.

Figure 5:
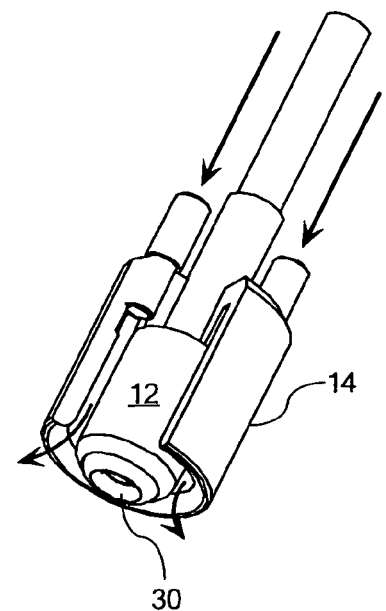
FIG. 5 is an isolated schematic illustration of a fluid porting assembly according to an alternative embodiment of the present invention.

Although the fluid porting assembly 10 illustrated in FIGS. 1-4, comprises a plurality of cooling fluid passageways 40 leading to a common cooling fluid outlet 44, it is also contemplated that the fluid porting assembly may comprises a plurality of cooling fluid passageways 40 that lead to distinct cooling fluid outlets collectively defining the cooling fluid interface 45. It is also contemplated that a variety of suitable variations to the structural configuration of the fluid porting assembly 10 can be practiced within the bounds of the present invention. One example of an alternative fluid porting assembly design is illustrated in FIG. 5, where like structure is identify with like reference numerals.

As is noted above, the port and flow channel complexity of various microreactors can vary widely and has merely been illustrated in relatively simple schematic form in FIG. 1. In many applications, the microreactor assembly will comprise a plurality of process fluid passageways 20 and a corresponding plurality of the pliable seals 30 and cooling fluid passageways 40 described herein. In addition, it is noted that the fluid porting assembly may further comprise a cooling fluid supply of, for example, compressed air, and a process fluid supply.

It is noted that recitations herein of a component of the present invention being "configured" in a particular way, to embody a particular property, or function in a particular manner, are structural recitations as opposed to recitations of intended use. More specifically, the references herein to the manner in which a component is "configured" denote an existing physical condition of the component and, as such, are to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present invention or to emphasize alternative or additional features that may or may not be utilized in a particular embodiment of the present invention.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

The invention claimed is:

1. A fluid porting assembly comprising a process fluid passageway, a pliable seal, and a cooling fluid passageway, wherein:
    the process fluid passageway comprises a process fluid inlet and a process fluid outlet;
    the pliable seal is positioned in the vicinity of the process fluid outlet and is configured to define a sealing interface between the process fluid outlet and a fluid port of a microreactor;
    the cooling fluid passageway comprises a cooling fluid inlet and a cooling fluid outlet that terminates at a cooling fluid interface;
    the cooling fluid interface defined by the cooling fluid outlet is displaced from the sealing interface defined by the pliable seal to define a dispensing gap between the cooling fluid interface and the sealing interface; and
    the cooling fluid outlet is configured to distribute cooling fluid about a periphery of the pliable seal and to direct cooling fluid away from the periphery of the pliable seal through the dispensing gap.

2. A fluid porting assembly as claimed in claim 1 wherein the fluid porting assembly is configured such that, when the pliable seal of the fluid porting assembly engages a fluid port of a microreactor, cooling fluid distributed about the periphery of the pliable seal is directed away from the pliable seal along a surface of the microreactor to remove heat from areas of the microreactor in the vicinity of the fluid port.

3. A fluid porting assembly as claimed in claim 1 wherein the cooling fluid passageway is configured to direct fluid moving downstream from the cooling fluid inlet toward the periphery of the pliable seal.

4. A fluid porting assembly as claimed in claim 1 wherein the cross-sectional area of the cooling fluid outlet is selected to expand in the direction of fluid flow moving downstream from the cooling fluid inlet.

5. A fluid porting assembly as claimed in claim 1 wherein the fluid porting assembly comprises an interior body portion that accommodates the process fluid passageway and an exterior body portion that cooperates with the interior body portion to form the cooling fluid passageway.

6. A fluid porting assembly as claimed in claim 5 wherein the exterior body portion is mounted to the interior body portion.

7. A fluid porting assembly as claimed in claim 6 wherein the exterior body portion, the interior body portion, or both, define a clamping surface against which a clamping force can be applied to urge the pliable seal into engagement with a microreactor surface portion surrounding the fluid port of the microreactor.

8. A fluid porting assembly as claimed in claim 5 wherein the interior body portion and the exterior body portion define a coaxial configuration.

9. A fluid porting assembly as claimed in claim 1 wherein the fluid porting assembly comprises a plurality of process fluid passageways and a corresponding plurality of pliable seals and cooling fluid passageways.

10. A fluid porting assembly as claimed in claim 1 wherein the pliable seal is formed from a polymeric material.

11. A fluid porting assembly as claimed in claim 1 wherein the pliable seal comprises a polymeric O-ring and the process fluid outlet comprises an O-ring seat accommodating the O-ring.

12. A fluid porting assembly as claimed in claim 1 wherein the fluid porting assembly comprises a plurality of cooling fluid passageways leading to a common cooling fluid outlet that defines the cooling fluid interface.

13. A fluid porting assembly as claimed in claim 1 wherein the fluid porting assembly comprises a plurality of cooling fluid passageways leading to distinct cooling fluid outlets that collectively define the cooling fluid interface.

14. A fluid porting assembly as claimed in claim 1 wherein the fluid porting assembly further comprises a cooling fluid supply and a process fluid supply.

15. A fluid porting assembly as claimed in claim 14 wherein the cooling fluid comprises air.

16. A microreactor assembly comprising a fluid porting assembly and a microreactor, wherein:
the microreactor comprises a fluid port in communication with one or more microreactor channels and a microreactor surface portion surrounding the fluid port;
the fluid porting assembly comprising a process fluid passageway, a pliable seal, and a cooling fluid passageway;
the process fluid passageway comprises a process fluid inlet and a process fluid outlet;
the pliable seal is positioned in the vicinity of the process fluid outlet and contacts the microreactor surface portion surrounding the fluid port so as to interface the process fluid outlet with the fluid port of the microreactor;
the cooling fluid passageway comprises a cooling fluid inlet and a cooling fluid outlet that terminates at a cooling fluid interface;
the cooling fluid interface defined by the cooling fluid outlet is displaced from the microreactor surface portion surrounding the fluid port to define a dispensing gap between the cooling fluid interface and the microreactor surface portion surrounding the fluid port; and
the cooling fluid outlet is configured to distribute cooling fluid about a periphery of the pliable seal and to direct cooling fluid away from the periphery of the pliable seal through the dispensing gap.

17. A microreactor as claimed in claim 16 wherein:
the microreactor assembly comprises a heat exchange assembly and a cooling fluid supply;
the microreactor heater is configured to maintain the microreactor at a reaction temperature $T_R$;
the composition and configuration of the pliable seal is such that it is more likely than not to fail at the reaction temperature $T_R$; and
the cooling fluid supply is configured to provide sufficient distribution of cooling fluid about the periphery of the pliable seal to maintain the temperature of the pliable seal below the reaction temperature $T_R$.

18. A microreactor as claimed in claim 17, wherein the heat exchange assembly comprises a thermal fluid supply and fluid channels configured for circulation of a thermal fluid from the thermal fluid supply.

* * * * *